United States Patent [19]

Renander et al.

[11] 4,409,738
[45] Oct. 18, 1983

[54] ARRANGEMENT FOR ADJUSTABLY MOUNTING AN OPTICAL DIRECTION INDICATOR

[75] Inventors: Åke C. Renander, Hovås; Rune P. S. Samuelsson, Angered, both of Sweden

[73] Assignee: Telefonaktiebolaget L M Ericsson, Stockholm, Sweden

[21] Appl. No.: 310,326

[22] Filed: Oct. 9, 1981

[51] Int. Cl.³ .............................................. G01C 1/00
[52] U.S. Cl. ....................................... 33/281; 33/299; 33/248
[58] Field of Search ................ 33/233, 235, 247, 248, 33/252, 263, 257, 260, 281, 290, 292, 298, 174 TA, 180 R; 248/177, 178, 183, 660–663

[56] References Cited

U.S. PATENT DOCUMENTS 2,643,844  6/1953  Nette .................................. 33/281 X
4,290,574  9/1981  Archibald ......................... 33/299 X
4,360,974  11/1982 Cuissart ......................... 33/174 H X

*Primary Examiner*—Harry N. Haroian
*Attorney, Agent, or Firm*—Hane, Roberts, Spiecens & Cohen

[57] ABSTRACT

In an arrangement for adjustably mounting an optical direction indicator, such as a sighting telescope (1) with associated base (4) on a substructure (8), the base (4) is provided with three attachment points (5, 6, 7), which are adjustable to give the direction indicator a prescribed direction in relation to the substructure. All three attachment points (5, 6, 7) are ball points. The ball (11) of the first attachment point is rigidly mounted. The ball (22) of the second attachment point (6) is movable in an arc about the first attachment point (5). The ball (31) of the third attachment point (7) is movable in the plane of the base (4) and at right angles thereto. There are two adjusting screws at the third attachment point (7), one for adjusting in the plan of the base (4) and one for adjusting at right angles thereto.

2 Claims, 4 Drawing Figures

4,409,738

ARRANGEMENT FOR ADJUSTABLY MOUNTING AN OPTICAL DIRECTION INDICATOR

FIELD OF THE INVENTION

The invention relates to an arrangement for the adjustable mounting of an optical direction indicator.

BACKGROUND

An adjustable mounting is disclosed in the Swedish Pat. No. 7316044-2, for an optical direction indicator in the form of a photocell. The disclosed mounting is, however, too large and does not permit aiming with sufficient precision for it to be used in the direction indicator intended by the present invention.

SUMMARY OF THE INVENTION

The invention is primarily intended for application to a direction indicating telescope in an armored vehicle or tank. The telescope must be adjustable to enable bore sighting, which in this case signifies that it shall be set parallel to the tank gun. Since there is only a small opening, possibly provided with a periscope, in the tank wall for the telescope line of sight, it is required that the telescope be moved a minor amount laterally and in altitude when its line of sight is altered during setting. It also occurs that parts of the telescope are exchanged for spares and that these are once again put in place; the means for aiming must therefore be graduated and allow adjustment with such precision that a previously tested setting can be reproduced without renewed testing. The means for mounting and setting the telescope must also be able to withstand heavy shocks.

In accordance with the invention, there is provided an arrangement for adjustable mounting of an optical direction indicator with associated base on a substructure by three attachment points. The first attachment point comprises a fixed ball allowing universal movement of the base about the first attachment point. The second attachment point comprises a ball adapted for movement in an arc whose center is located at a first attachment point with the arc lying approximately in a plane through the three attachment points. The third attachment point comprises a ball adapted for displacement by a first setting screw substantially at right angle to the plane through the three attachment points for pivoting the base and the direction indicator about an axis through the first and second attachment points and, also, by a second setting screw for displacing the ball of the third attachment point in an arc whose center is at the first attachment point with the arc lying approximately in the plane through the three attachment points for pivoting the base and the direction indicator about an axis through the fixed ball at the first attachment point at right angles to the plane containing the arc. With this solution there is achieved that the arrangement for mounting and setting the optical direction indicator meets the demands made on it and with the arrangement only taking up a small part of the limited space in the tank.

DESCRIPTION OF FIGURES

An arrangement in accordance with the invention will now be described while referring to the appended drawing, where.

MODE FOR CARRYING OUT THE INVENTION

Figure 1:
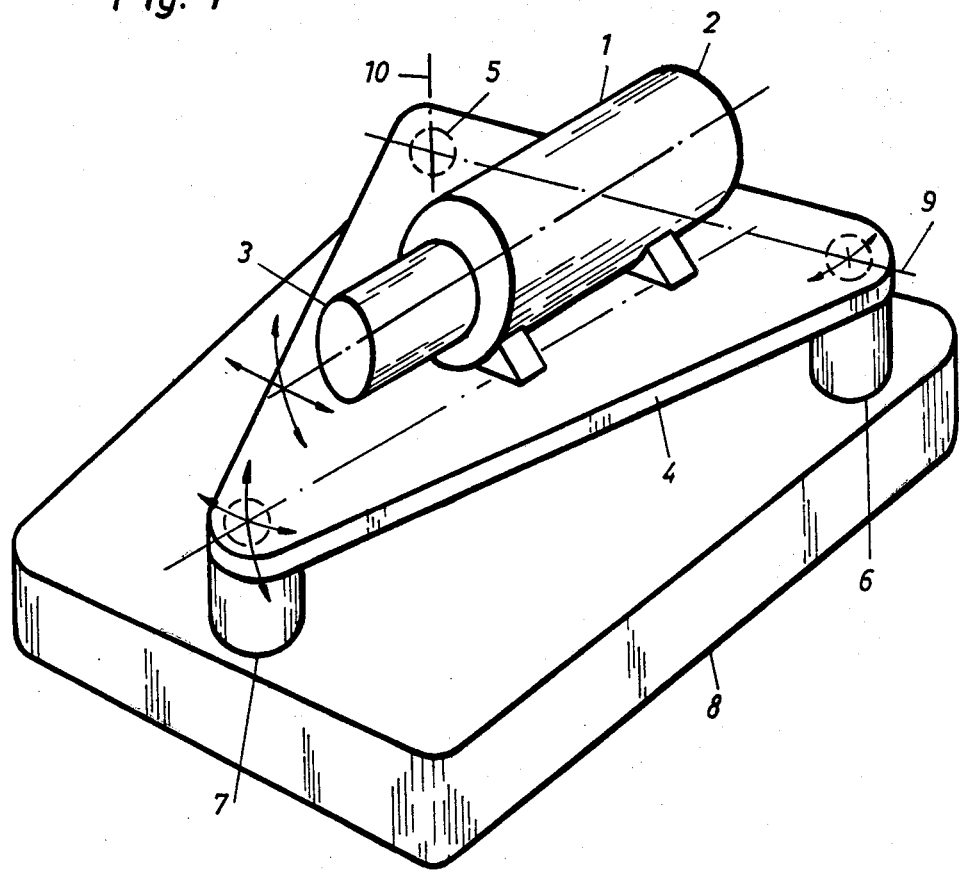
FIG. 1 is a perspective view of an optical direction indicator and its mounting.

In the arrangement in accordance with the invention described herein, there is shown in FIG. 1 an optical direction indicator in the form of an aiming telescope 1 with its object lens at 2 and its eyepiece at 3 and rigidly attached to a base 4 in the form of a plate. The base 4 is connected at three attachment points 5, 6 and 7 to a substructure which is indirectly connected to the tank gun and is movable in the same way as the gun. The substructure is schematically illustrated as a foundation plate 8, and is otherwise not regarded as requiring any description in this connection.

Figure 2:
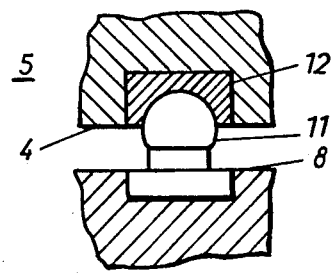
FIG. 2 illustrates a first attachment point in the mounting.

As is shown in detail in FIG. 2, the first attachment point 5 comprises a male ball portion 11 rigidly attached to the substructure 8, with a female portion 12 pressed into the base 4 and resting against the ball portion 11. The attachment point is thus formed to allow the base 4, and thereby the sighting telescope 1, to be moved without hindrance in all directions about the center of the ball portion 11.

Figure 3:
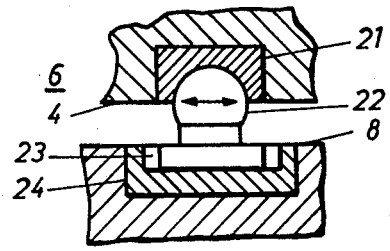
FIG. 3 illustrates a second attachment point in the mounting.

In the second attachment point 6, illustrated in FIG. 3, the ball joint comprises a female portion 21 pressed into the base 4 and resting against a male ball portion 22. The ball portion 22 in turn rests in a flat bottomed recess 23 in an insert 24 in the substructure 8. The recess 23 permits a small lateral movement of the ball joint.

Both attachment points 5 and 6 are at the same level. When the base 4 is turned around the attachment point 5, the ball portion 22 will be moved in an arc in the plane of the base and with its center coinciding with the pivoting center of the first attachment point 5.

Figure 4:
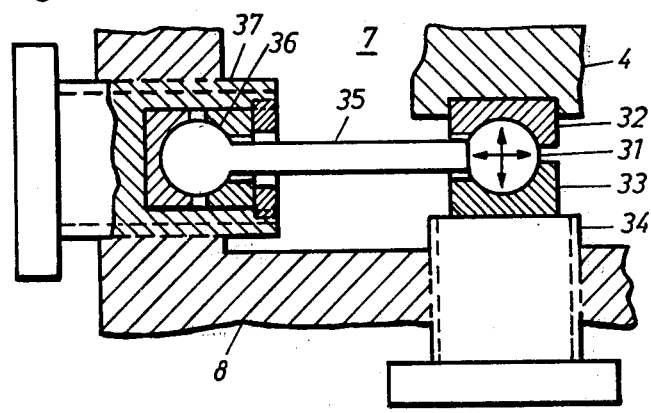
FIG. 4 illustrates a third attachment point in the mounting.

As will be seen from FIG. 4, the third attachment point 7 also includes a ball 31 engaging against an overlying complementally formed piece 32 pressed into the base 4 and an underlying complementally formed piece 33 resting against a first setting means 34, in the form of an adjustment screw 34 with its end cut off square, and which is screwed into a threaded hole through the substructure 8 at right-angles to the base 4. Rotating the screw provides movement at right-angles to the plane of the base 4 for the base and the telescope 1, this movement resulting in pivoting about an axis 9 through the centers of the ball joints in the first and second attachment points 5 and 6, see FIG. 1, and gives the sighting telescope 1 its elevation setting.

Springs, not shown on the drawing, are arranged for pressing the base 4 against the balls 11, 22, 31 and still allow movement of the base in plan, as well as at right angles thereto via the adjusting screw 34.

As will be seen in FIG. 4, the ball 31 at the third attachment point 7 is rigidly connected to a second ball 36 via a member 35, said ball 36 being movably clamped in a second setting means 37, here in the form of a second adjustment screw 37, which is screwed into a threaded hole through the substructure 8, substantially parallel to the axis 9 of the attachment points 5 and 6. Rotation of the second adjustment screw moves the ball 31 in the direction of the screw, giving the base 4 and telescope 1 a movement in the plane of the base, which is a pivoting movement about the axis 10 of the attachment point 5, the axis 10 being perpendicular to the plane of the base 4. Pivoting caused by the second setting means 37 provides the telescope 1 with its lateral angle setting.

Setting the sighting telescope 1 in the intended direction is actually always possible, there being no demands made for this setting that the axis of the telescope shall be at right angles to the axis 9 through both attachment points 5 and 6, or that it shall be parallel to the plane of the base 4. The setting is possible as long as the direction of the telescope axis deviates from the directions of the axis 9 and 10.

Both adjustment screws 34, 37 are provided with graduations (not shown). These graduations enable setting the telescope 1 with such precision that the error attains at most 0.1 milliradian. The setting range for the telescope is 20 milliradians in latitude and in elevation.

In the example described, the distance from the axis of the telescope 1 to the first pivoting axis 9 of the mounting is only 37 mm and to the second pivoting axis 10 thereof only 20 mm, whereby both distances are less than the telescope diameter, which is about 40 mm. The telescope axis is thus only moved a minor amount during setting, so that sighting is always possible despite the smallness of the opening for the telescoping in the tank wall.

The arrangement also meets the demand of only taking up a small amount of the limited space in the tank. It is also highly durable to shocks.

What we claim is:

1. Arrangement for adjustably mounting an optical direction indicator such as a sighting telescope (1) with associated base (4) on a substructure (8) provided with three attachment points (5,6,7), adjustable for giving the direction indicator a prescribed direction in relation to the substructure, the improvement wherein the first attachment point 5 comprises a fixed ball means (11) allowing universal movement of the base (4) about the first attachment point (5), the second attachment point (6) comprises a ball means (22) adapted for movement in an arc with its center at the first attachment point (5) and with the arc approximately in a plane through the three attachment points (5,6,7), the third attachment point (7) comprises a ball means (31) adapted for displacement by a first setting means (34) substantially at right angles to the plane through the three attachment points (5,6,7) for pivoting the base (4) and the direction indicator (1) about an axis (9) through the first and second attachment points (5,6), and also by a second setting means (37) for displacing said ball means (31) in an arc with its center at the first attachment point (5) and with the arc approximately in the plane through the three attachment points (5,6,7) for pivoting the base (4) and the direction indicator (1) about an axis (10) through the fixed ball means 5 at right-angles to said plane, said first setting means (34) including a graduated, setting screw (34) acting directly on the ball means (31) of the third attachment point, (7) said second setting means (37) including a second graduated setting screw (37) connected to the ball means (31) of the third attachment point by a rigid member (35) universally pivotable at the second setting screw (37) and at the ball means (31).

2. Arrangement as claimed in claim 1, wherein the distance from the axis of the direction indicator (1) to each of both pivoting axes (9, 10) of the base is less than a measurement substantially equal to the diameter of the direction indicator, resulting in a minimum of displacement of the direction indicator axis, due to its setting in the prescribed direction.

* * * * *